United States Patent [19]

Henn

[11] Patent Number: 4,843,954
[45] Date of Patent: Jul. 4, 1989

[54] TEA MAKING MACHINE

[75] Inventor: Stefan Henn, Solingen, Fed. Rep. of Germany

[73] Assignee: Robert Krups Stiftung & Co. KG, Solingen, Fed. Rep. of Germany

[21] Appl. No.: 195,125

[22] Filed: May 16, 1988

[30] Foreign Application Priority Data

May 26, 1987 [DE] Fed. Rep. of Germany ....... 3717678

[51] Int. Cl.[4] ........................................... A47J 31/043
[52] U.S. Cl. ..................................... 99/292; 99/285; 99/299
[58] Field of Search ............... 99/279, 280, 281, 282, 99/285, 292, 293, 294, 299, 300, 302 R; 426/433

[56] References Cited

U.S. PATENT DOCUMENTS

| | | | |
|---|---|---|---|
| 1,822,238 | 9/1931 | Albanese | 99/292 |
| 2,885,949 | 5/1959 | Curtis | 99/292 |
| 3,130,663 | 4/1964 | Wickenberg | 99/292 |
| 3,224,360 | 12/1965 | Wickenberg | 99/292 |

FOREIGN PATENT DOCUMENTS

| | | |
|---|---|---|
| 686482 | 1/1940 | Fed. Rep. of Germany ......... 3312354/111986dex |
| 2428165 | 11/1974 | Fed. Rep. of Germany . |
| 3312354 | 11/1986 | Fed. Rep. of Germany . |

Primary Examiner—Robert W. Jenkins
Attorney, Agent, or Firm—Peter K. Kontler

[57] ABSTRACT

A tea making machine wherein the bottom wall of an upper vessel can be used to seal the open top of a lower vessel which contains a supply of water. The upper vessel contains a supply of tea leaves and its bottom wall has an upright tubular portion for a riser with an open upper end in the upper vessel and an open lower end in the lower vessel. The riser is adjustable so that its lower end can be moved to any one of a number of different levels above the bottom of the lower vessel. When the supply of water in the lower vessel is heated, the pressure in the lower vessel rises and boiling water is compelled to flow up the riser and into the upper vessel where it contacts the tea leaves. When the level of the supply of water in the lower vessel descends below the lower end of the riser, such water must be evaporated in order to rise into the upper vessel. The interval which elapses for evaporation determines the steeping time in the upper vessel. When the evaporation of water from the lower vessel is completed and the heaters for the lower vessel are turned off, the pressure in the lower vessel decreases so that the lower vessel draws the beverage from the upper vessel by way of the riser.

24 Claims, 1 Drawing Sheet

U.S. Patent    Jul. 4, 1989    4,843,954
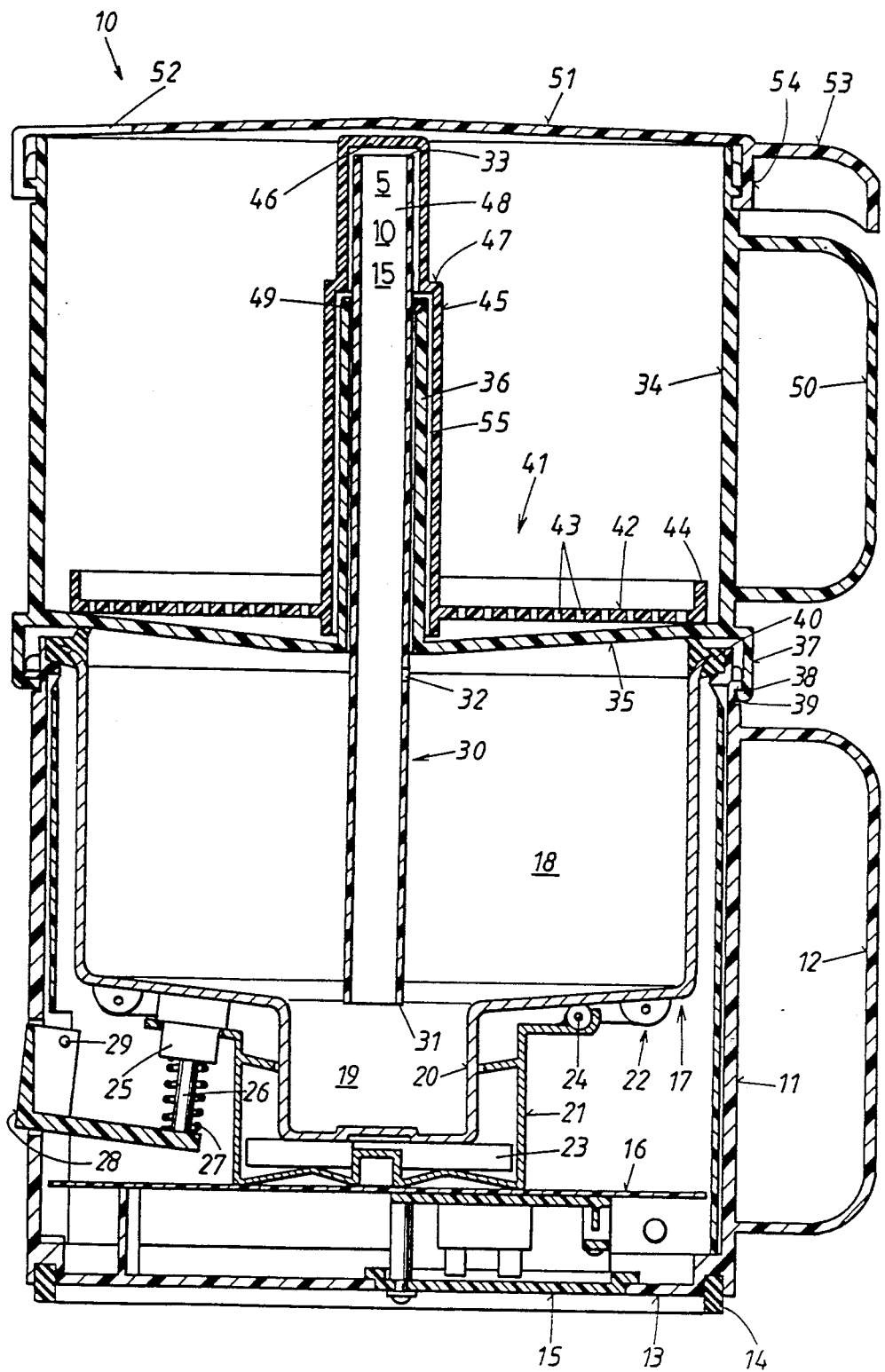

TEA MAKING MACHINE

BACKGROUND OF THE INVENTION

The invention relates to machines for brewing hot beverages, and more particularly to improvements in tea making machines. Still more particularly, the invention relates to improvements in tea making machines of the type wherein a first vessel serves to confine a supply of water to be heated, a second vessel contains a supply of tea leaves to be steeped in hot water, and a riser connects the two vessels to permit heated water to flow from the first vessel into the second vessel.

German Offenlegungsschrift No. 2 428 165 discloses an appliance which can be used as a coffee maker or as a tea making machine and wherein a first vessel which can receive a supply of fresh water to be heated is disposed beneath a second vessel having a first compartment for a supply of pulverulent coffee or for a supply of tea leaves and a second compartment for the beverage. An electric heater is adjacent the bottom of the first vessel, and the second vessel can be hermetically sealed to prevent the aroma from escaping when the machine is in use. The bottom portion of the second compartment in the second vessel is adjacent a solenoid operated valve which must be opened in order to permit the beverage to leave the respective compartment of the second vessel. A riser is provided to establish a path for the flow of hot water from the first vessel into the first compartment of the second vessel. One open end of the riser is adjacent the bottom of the first vessel (i.e., adjacent the electric heater for fresh water), and the other open end of the riser is adjacent the detachable closure or cover at the top of the first compartment of the second vessel. An intermediate portion of the riser extends through the bottom of the first compartment of the second vessel, and such bottom forms part of the closure for the first vessel. When the machine is put to use, the electric heater is connected to an energy source to heat water in the first vessel to the boiling point whereby the pressure in the first vessel rises and boiling water is caused to ascend in the riser and to overflow into the first compartment of the second vessel. The duration of so-called brewing or steeping time (the interval of contact between boiling water and comminuted coffee beans or tea leaves) is determined by the operator of the machine. To this end, the machine is equipped with a clock which is set by the operator and opens the solenoid operated valve after elapse of the selected interval of time. This enables freshly brewed coffee or tea to descend from the respective compartment of the second vessel and to accumulate in a coffee pot or in a teapot.

A drawback of the just described conventional machine is that it must employ a very long riser which extends from the bottom of the first vessel and all the way to, or into close proximity of, the top of the second vessel. The riser is fixedly secured to the cover for the first vessel, i.e., to the bottom wall of the second vessel. Moreover, the machine must be furnished with a clock and with a solenoid operated valve for evacuation of beverage from the second vessel.

German Pat. No. 686 482 discloses a coffee or tea making machine wherein three vessels must be disposed on top of each other. The uppermost vessel has a heating belt, a switch for the heater and an outlet valve and serves to store a supply of fresh water which is to be heated. A steeping or brewing vessel is disposed beneath the topmost vessel and is equipped with a filter and an outlet valve. The lowermost vessel serves to receive hot beverage from the steeping or brewing vessel. A drawback of this machine is that the combined height of the three vessels is excessive and that not only the uppermost vessel but also the steeping or brewing vessel must be provided with a discrete valve-controlled outlet for the liquid. This contributes to the cost of the machine, especially if the valves are to be controlled by clocks.

German Pat. No. 3 312 354 discloses a modified tea making machine with three superimposed vessels. The vessel for the supply of fresh water is equipped with a heater and a cover and has an adjustable outlet for admission of hot water into a steeping vessel. The latter has an outlet which can discharge tea directly into a teapot or another suitable tea collecting vessel. The adjustable outlet of the vessel for the supply of fresh water includes a siphon type riser, and the outlet of the steeping vessel is controlled by a valve which is actuatable by a clock. This machine also exhibits the drawback that the combined height of its three vessels is excessive. Moreover, the aforementioned valve must be controlled by an electronic unit which contributes to the cost of the machine.

OBJECTS AND SUMMARY OF THE INVENTION

An object of the invention is to provide a novel and improved tea making machine which need not employ more than two vessels.

Another object of the invention is to provide a tea making machine wherein the so-called steeping time can be selected in a simple and inexpensive way.

A further object of the invention is to provide a tea making machine which need not be equipped with electrical, electronic or other complex and expensive steeping time selectors.

An additional object of the invention is to provide the tea making machine with novel and improved means for effecting the transfer of heated water from a first vessel into a second vessel.

A further object of the invention is to provide a novel and improved water heating vessel for use in the above outlined machine.

Still another object of the invention is to provide a novel and improved steeping vessel for use in the above outlined tea making machine.

An additional object of the invention is to provide novel and improved closures for the water heating and steeping vessels of the above outlined machine.

Another object of the invention is to provide novel and improved means for heating the respective vessel of the above outlined machine.

A further object of the invention is to provide a novel and improved steeping time selector for use in the above outlined tea making machine.

Another object of the invention is to provide a novel and improved mounting for the riser in the above outlined tea making machine.

An additional object of the invention is to provide a tea making machine whose overall height is a fraction of the height of many presently known tea making machines of identical capacity.

Another object of the invention is to provide a novel and improved method of selecting the steeping time in a tea making machine.

The improved tea making machine comprises a first vessel having an open top and serving to receive a supply of water, means for heating the first vessel to the boiling point of the supply of water therein, a closure for the open top of the first vessel, a second vessel which is disposed above the first vessel and has an open top and serves to receive and confine a supply of tea leaves, a cover for the open top of the second vessel, and a riser having open lower and upper ends which are respectively disposed within the first and second vessels. The riser provides a path for the flow of water between the vessels and is selectively movable up and down between a plurality of different positions in each of which a different quantity of water in the first vessel is located beneath the open lower end of the riser so that the selected position of the riser determines the interval of time which is required to evaporate the quantity of water beneath the lower end of the riser. Thus, when the supply of water in the first vessel is heated to the boiling point, the pressure in the first vessel rises and causes water to ascend in the riser and enter the second vessel. However, that quantity of water which remains in the first vessel below the open lower end of the riser must be evaporated in order to leave the first vessel by way of the riser.

The riser can constitute an outlet for evacuation of the beverage which is formed in the second vessel as a result of steeping tea leaves in water that has risen from the first vessel into the second vessel along the path which is defined by the riser when the water is heated to the boiling point and the pressure in the first vessel rises as a result of evaporation of boiling water.

The bottom wall of the second vessel can constitute or form part of the closure for the open top of the first vessel. The bottom wall of the second vessel can be provided with a preferably centrally located tubular portion which extends into the interior of the second vessel, and the riser can be longitudinally movably installed in the tubular portion of the second vessel. Friction generating means can be interposed between the riser and the tubular portion of the bottom wall of the second vessel. Such friction generating means can include one or more elastic sealing rings which surround the riser and are disposed within the tubular portion.

A sieve or filter (tea leaf infuser) can be removably installed in the second vessel to support the supply of tea leaves in the second vessel. The sieve is preferably provided with an upwardly extending sleeve which receives the open upper end of the riser. Such sleeve is provided with a top wall which overlies but is or can be spaced apart from the open upper end of the riser. The riser and the sieve define a clearance for the flow of water between the open upper end of the riser and the interior of the second vessel, i.e., hot water can flow from the first vessel into the second vessel, and the properly steeped beverage can flow from the second vessel into the first vessel. The aforementioned clearance communicates with a space which is defined for the flow of water between the tubular portion of the bottom wall of the second vessel and the sleeve to permit water to flow between the open upper end of the riser and the interior of the second vessel.

The riser is preferably provided with one or more openings which are disposed between the open upper and lower ends and serve to permit penetration of water vapors directly from the upper portion of the interior of the first vessel into the riser and thence into the second vessel.

The aforementioned sieve further comprises an apertured bottom panel which is adjacent the bottom wall of the second vessel, and such panel is preferably provided with an upwardly extending marginal rim to confine the supply of tea leaves at a level above the panel. The sleeve of the sieve is or can be integral with the central portion of the bottom panel. The axis of the sleeve is preferably normal to the plane of the bottom panel, i.e., the sleeve is vertical if the bottom panel is horizontal when the sieve is properly inserted into the second vessel.

The aforementioned closure for the open top of the first vessel can further comprise a bayonet mount which separably and sealingly connects the bottom wall of the second vessel to the adjacent topmost portion of the first vessel.

The first vessel can include a preferably cylindrical upper section which defines a first chamber for the supply of water, and a preferably cylindrical second section which defines for the supply of water a second chamber beneath the first chamber. The open lower end of the riser can be located at a level which is close to and above or below the second chamber in at least one position of the riser (e.g., the lower end of the riser can be located at the boundary between the first and second chambers in the upper end position of the riser) so that the quantity of water in the second chamber can determine, or at least contributes to determination of, the aforementioned interval of time which is required to evaporate water from the first vessel at a level below the open lower end of the riser. The machine further comprises a preferably cylindrical housing which can surround a portion of or the entire first vessel. The diameter of the housing need not appreciably exceed the diameter of the upper section of the first vessel. The lower section of the first vessel is or can be located substantially centrally of the upper section, and its diameter can be a small fraction of the diameter of the upper section.

The heating means can comprise discrete first and second heaters for water in the upper and lower sections of the first vessel, and the heat output of the first heater can greatly exceed the heat output of the second heater.

The machine can further comprise at least one thermostat, e.g., a single thermostat which turns off the first heater when the temperature in the upper section of the first vessel rises to a preselected value. Such thermostat can be movably mounted in the housing so that it pops out of the operative position when the respective heater is turned off.

The novel features which are considered as characteristic of the invention are set forth in particular in the appended claims. The improved tea making machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a substantially central vertical sectional view of a tea making machine which embodies one form of the invention, with the riser shown in or close to its upper end position and with the bottom wall of the second vessel sealingly secured to the open top of the first vessel by a bayonet mount and a sealing ring.

DESCRIPTION OF PREFERRED EMBODIMENTS

The drawing shows only those components of the improved tea making machine 10 which are necessary for full understanding of the invention. For example, the drawing does not show means for supplying electrical energy to the heating means 22, 23 for the supply of water in a first or lower vessel 17 of the machine 10, the controls which are to be actuated in order to connect the heating means with or to disconnect the heating means from the energy source, the means for selecting the temperature to which the supply of water in the vessel 17 is to be heated, the controls (if any) for steeping time and certain other standard features. All such missing components can be constructed, installed and manipulated in the same way as in a conventional tea making machine, e.g., in automatic tea maker No. 249 with electronic steeping control which is distributed by the assignee of the present application.

The illustrated tea making machine 10 comprises a housing 11 which includes a hollow cylinder with a bottom 13 having at its underside a circumferentially complete or interrupted marginal groove for a ring-shaped support 14 which comes in actual contact with the top of a table, with the top of a counter or with the top of any other piece of furniture serving as a carrier of the machine 10. The cylindrical wall of the housing 11 is provided with an external handle 12. The circumferentially complete ring-shaped support 14 can be replaced with two or more discrete legs which are partially recessed into and are otherwise affixed to the bottom 13 of the housing 11. A detachable plate-like closure 15 normally overlies an opening which is provided in the bottom 13 and can be exposed to afford access to a compartment beneath a horizontal partition 16 in the lower portion of the housing 11. The compartment beneath the partition 16 can accommodate certain electrical and/or electronic components of the machine 10. The partition 16 is or can be parallel to the bottom 13 and preferably extends across the entire interior of the housing 11 at an appropriate distance from the closure 15. The first vessel 17 is disposed at a level above the partition 16 and is at least substantially confined in the housing 11. This vessel includes a relatively large cylindrical upper section defining a first water chamber 18, and a relatively small cylindrical lower section 20 defining a second chamber 19. The chamber 19 is disposed beneath and communicates with the central part of the first chamber 18. The diameter of the upper section approximates the diameter of the cylindrical wall of the housing 11, and the diameter of the lower section 20 is or can be a relatively small fraction of the diameter of the upper section. The quantity of water which is confined in the chamber 19 beneath the open lower end 31 of a vertically movable straight cylindrical riser 30 determines the steeping time, i.e., the interval of time which is to elapse in order to effect complete evaporation of water from the vessel 17 when the machine 10 is in use and the heating means 21, 22 for the vessel 17 is on. The diameter of the upper section of the vessel 17 can be several times (e.g., at least four times) the diameter of the lower section 20. The capacity of the chamber 18 in the upper section of the vessel 17 determines the number of cups to be filled with tea which is obtained as a result of contact between heated water and a supply of tea leaves in a second (steeping) vessel 34 of the machine 10.

The drawing shows the riser 30 in or close to its upper end position in which the open lower end 31 is located at the level of the uppermost part of the lower section 20 of the vessel 17. Thus, the selected steeping time is relatively long if such steeping time is determined by the interval of time which elapses in order to effect evaporation of the water from the vessel 17 below the open lower end 31 of the riser 30.

The heating means for the supply of water in the vessel 17 comprises a first electric heater 22 which is adjacent the bottom of the chamber 18 and is located radially outwardly of the lower section 20, and a second electric heater 23 which is disposed below the bottom of the lower section 20. The heat output (e.g., 800 watts) of the heater 22 can greatly exceed the heat output (e.g., 40 watts) of the heater 23. The space between the partition 16 and the bottom of the vessel 17 further accommodates a conventional fire protector 24 and a conventional mobile thermostat 25 for the heater 22. The means for supporting the thermostat 25, the fire protector 24 and the heater 23 includes a holder 21 which can be provided with a radially inwardly extending portion (or with several discrete radially inwardly extending prongs) in frictional engagement with the exterior of lower section 20 of the vessel 17. If desired, the machine 10 can be provided with a second thermostat to control the heating action of the electric heater 23 for the section 20.

The thermostat 25 comprises a stud or pin 26 which extends from its casing and is surrounded by a coil spring 27. One end of the spring 27 reacts against the casing of the thermostat 25, and the other end of this spring bears against an actuator 28 which is pivotable in the housing 11, as at 29. A portion of the actuator 28 is accessible at the exterior of the cylindrical wall of the housing 11.

The closure for the open top of the vessel 17 includes the bottom wall 35 of the second vessel 34. The bottom wall 35 cooperates with a bayonet mount and with a ring-shaped sealing element 40 to hermetically seal the open top of the vessel 17 when the machine 10 is in use. The bayonet mount includes a first portion 37 in the form of a downwardly extending interrupted or circumferentially complete rim 37 which is integral with the marginal portion of the bottom wall 35 and has a coupling portion 38 cooperating with a complementary coupling portion 39 on the topmost portion of the cylindrical wall of the housing 11. The housing 11 has an inwardly extending annular flange which is overlapped by the sealing element 40; the latter is deformed and is maintained in requisite sealing engagement with the bottom wall 35, with the topmost portion of the vessel 17 and with the adjacent portion of the housing 11 when the coupling portion 38 properly engages the coupling portion 39. These coupling portions can be disengaged in response to turning of the vessel 34 relative to the housing 11. The vessel 34 is then ready to be lifted off the vessel 17, and the latter can receive a supply of fresh water. As can be seen in the drawing, the sealing element 40 has a lip which contacts the underside of the bottom wall 35 when the bayonet mount including the coupling portions 38, 39 is operative to deform the sealing element 40 between the housing 11 and the vessels 17, 34.

The capacity of the second vessel 34 can match or approximate the capacity of the vessel 17. The vessel 34 has an open top which can be closed by a cover or lid 51 having a rim 54 adapted to engage the top portion of the vessel 34 and having a handle 53. The separable connection between the cover 51 and the open top of the vessel 34 can also comprise, constitute or resemble a bayonet mount. The arrangement is preferably such that the dimensions of the rim 54 and its non-referenced coupling portion match the dimensions of the rim 37 and coupling portion 38 so that, when the cover 51 is detached from the vessel 34 and the latter is lifted off the vessel 17, the cover 51 can be used as a closure for the open top of the vessel 17 and for the supply of tea therein. That portion of the cover 51 which is remotest from the handle 53 has an outlet 52 which renders it possible to pour hot beverage directly from the vessel 34. When the vessel 34 is detached from the vessel 17 and the open top of the vessel 17 is connected with the cover 51, the outlet 52 permits pouring of tea from the interior of the vessel 17. A handle 50 on the cylindrical wall of the vessel 34 facilitates manipulation of this vessel, for example, in order to engage or disengage the bayonet mount including the coupling portions 38, 39. The handles 12, 50 and 53 can constitute integral parts of the housing 11, vessel 34 and cover 51, respectively.

In accordance with a feature of the invention, the riser 30 is movable up and down between a plurality of different positions in which its open lower end 31 is disposed at different levels above the bottom of the lower section 20 of the vessel 17. This riser provides a path for the flow of water (i.e., heated water or tea) between the interior of the vessel 17 and the interior of the vessel 34. The open upper end 33 of the riser 30 is confined in the smaller-diameter upper portion of a cylindrical sleeve 45 forming part of a sieve or filter (tea leaf infuser) 41 whose bottom panel 42 has perforations 43 and is in more or less linear contact with the conical upper side of bottom wall 35 of the vessel 34. The illustrated riser 30 is a straight cylinder; however, it is equally possible to employ a curved riser or a riser having two offset straight portions and an inclined connecting portion between the straight portions. The axial position of the riser 31 relative to the vessels 17, 34 can be changed upon detachment of the vessel 34 from the housing 11 and vessel 17 so that the lower portion of the riser become accessible. As mentioned above, the selected axial position of the riser 30 will determine the steeping time which is the interval of time that elapses for complete evaporation of water at the level below the open lower end 31 of the riser 30. The selection of appropriate level of the lower end 31 of the riser 30 is facilitated by the provision of a scale 48 on the upper end portion of the riser. The graduations of this scale indicate different steeping times in units of time (e.g., in minutes). The scale 48 is observable through the preferably transparent or translucent material of the cover 51, vessel 34 and sleeve 45 of the sieve 41. It is clear that the scale 48 can carry a larger number of graduations some of which indicate the steeping time in fractions of minutes.

The means for locating and holding the riser 30 in a selected axial position includes an elastic sealing ring 49 which surrounds the riser 30 intermediate its open ends 31, 33 and is partially recessed into a circumferential groove provided in the internal surface of a tubular portion 36 of the bottom wall 35. The axis of the tubular portion 36 preferably extends at right angles to the general plane of the bottom wall 35. The tubular portion 36 can surround two or more sealing elements 49, depending on the extent to which the sealing elements are deformed by the riser 30 and on the desired force with which the riser 30 is to be held in a selected axial position.

The sieve 41 can be lifted out of the vessel 34 when the cover 51 is detached. The top wall 46 of the sleeve 45 is normally spaced apart from the open upper end 33 of the riser 30, even when the riser assumes the upper end position which is shown in the drawing. This ensures that hot water and/or vapors can flow along the path which is defined by the riser 30 as well as through the preferably annular clearance or space 55 which is defined in part by the exterior of the upper end portion of the riser 30 and the adjacent smaller-diameter upper portion of the sleeve 45, and in part by the larger-diameter lower portion of the sleeve 45 and the tubular portion 36 of the bottom wall 35.

The riser 30 is provided with at least one opening 32 which is located in the interior of the vessel 17, even when the riser assumes the illustrated upper end position, to permit vapors which gather in the upper portion of the vessel 17 to escape into the vessel 34 by way of the riser 30 and through the space or clearance 55, particularly during the initial stage of tea making.

The bottom panel 42 of the sieve 41 is provided with a circumferentially complete upwardly extending marginal rim 44 so as to confine the supply of tea leaves in the space above the panel 42 between the rim 44 and the tubular portion 36. The diameter of the rim 44 is only slightly smaller than the diameter of the cylindrical wall of the vessel 34; this ensures that a substantial supply of tea leaves can be introduced into the space above the bottom panel 42. The stream or streams of hot water or vapors entering the vessel 34 via outlet of the clearance 55 are admitted into the space between the conical upper side of the bottom wall 35 and the substantially horizontal underside of the bottom panel 42 so that such hot water or vapors must penetrate through the perforations 43 of the panel 42 on their way into the upper portion of the vessel 34.

The operation of the tea making machine 10 is as follows:

The cylindrical wall of the vessel 17 is preferably provided with graduations indicating the number of tea cups which can be filled when the vessel 17 is filled with fresh water to the respective level. For example, the vessel 17 can receive a supply of fresh water which suffices to make eight cups of tea. The vessel 17 receives fresh water while its open top is exposed, i.e., while the vessel 34 is detached from the housing 11 and the cover 51 is not applied to the open top of the vessel 17. The person in charge of making tea then selects the axial position of the riser 30 with assistance from the scale 48 so that the steeping time is selected in advance. In the next step, the operator places the vessel 34 on top of the vessel 17 and seals the open top of the vessel 17 by engaging the coupling portion 38 of the rim 37 with the coupling portion 39 of the housing 11 to properly deform the sealing element 40. The sieve 41 with a selected quantity of tea leaves is inserted into the vessel 34 and the cover 51 is attached to the open top of the vessel 34. The machine 10 is then ready to heat the supply of water in the vessel 17. The supply of tea leaves can be deposited on the bottom panel 42 prior or subsequent to insertion of the sieve 41 into the vessel 34.

The operator actuates the corresponding controls (not shown) to activate the heaters 22 and 23 so as to raise the temperature of water in the vessel 17 to the boiling point. Steam which develops during the initial stage of heating water in the chambers 19 and 20 escapes from the vessel 17 by way of the opening or openings 32 in the intermediate portion of the riser 30.

As the steam accumulates in the upper portion of the vessel 17, the pressure in this vessel rises and a column of heated water ascends in the riser 30 to overflow into the vessel 34 by way of the clearance 55 and to rise in the vessel 34 by flowing through the perforations 43 of the bottom panel 42, i.e., hot water is compelled to contact the supply of tea leaves on the bottom panel 42. If the rate of flow of heated water from the vessel 17 into the vessel 34 is sufficiently high, the acending column of water lifts the entire sieve 41 to thereby move the top wall 46 of the sleeve 45 upwardly and away from the open upper end 33 of the riser 30 and to thus enlarge the path for admission of hot water into the vessel 34. The flow of heated water from the vessel 17 into the vessel 34 is interrupted when the chamber 19 in the upper section of the vessel 17 is empty or nearly empty, i.e., when the upper level of water in the vessel 17 descends below the level of the open lower end 31 of the riser 30. Therefore, the heater 22 exchanges less heat with the adjacent portion of the upper section of the vessel 17; this is detected by the thermostat 25 which disconnects the heater 22 from the source of electrical energy. However, the pressure in the upper chamber 18 of the vessel 17 remains relatively high because the heater 23 beneath the section 20 continues to heat water in the chamber 19, i.e., the pressure in the chamber 18 remains relatively high during the selected steeping time which is a function of the axial position of the riser 30 in the tubular portion 36 of the bottom wall 35.

The ascending water vapors condense in the supply of tea leaves on the bottom panel 42 of the sieve 41 so that the upper level of the beverage in the vessel 34 rises. Energy which is released as a result of condensation of water vapors in the vessel 34 prevents rapid cooling of the beverage. Turbulence which develops in the lower portion of the vessel 34 as a result of penetration of water vapors from the clearance 55 into the space beneath the bottom wall 42 of the sieve 41 promotes intimate contact between water and tea leaves above the perforations 43 to thus ensure efficient utilization of the supply of tea leaves in the space above the bottom wall 42 intermediate the rim 44 and the sleeve 45 of the sieve 41.

The pressure in the vessel 17 drops below atmospheric pressure when the evaporation of water by way of the open lower end 31 of the riser and opening or openings 32 is completed. The resulting subatmospheric pressure in the chambers 18, 19 enables the vessel 17 to draw the beverage from the vessel 34 by way of the riser 30. The bottom panel 42 intercepts the tea leaves so that they remain in the vessel 34.

The beverage which gathers in the vessel 17 can be served directly from this vessel (upon detachment of the vessel 34 from the housing 11). Alternatively, the beverage can be poured from the vessel 17 into a suitable teapot. Still further, the vessel 34 can be detached from the housing 11 and the latter can be connected with the cover 51 so that the outlet 52 of the thus applied cover can be used to pour the beverage from the vessel 17. If desired, the vessel 17 can be provided with a spout (not shown) which carries a spigot and can serve for evacuation of beverage from the vessel 17 in a manner similar to that known from the art of samovars.

The improved tea making machine is susceptible of many modifications without departing from the spirit of the invention. For example, and as already mentioned above, a discrete second thermostat can be provided for the heater 23 to deactivate this heater as soon as the temperature in the section 20 of the vessel 17 rises to indicate that the entire supply of water has been transferred into the vessel 34. Furthermore, and as also mentioned above, the riser 30 need not constitute a straight cylinder. This riser can be held in a selected axial position by the aforementioned elastic ring or rings 49 and/or by any other suitable means. Still further, the diameter of the section 20 of the vessel 17 need not be much smaller than that of the upper section; in fact, the diameter of the section 20 can match that of the upper section. The illustrated design of the vessel 17 is preferred at this time because it renders it possible to confine a relatively small quantity of water in the chamber 19. This, in turn, renders it possible to select the steeping time with a much higher degree of accuracy. It is also within the purview of the invention to provide means for effecting evacuation of beverage from the vessel 34 directly into a teapot or the like rather then into the lower vessel 17. All such modifications, and many others, will be readily comprehended by those possessing the required skill in the art.

An advantage of the improved tea making machine is that its overall height is a fraction of the height of conventional machines wherein three vessels must be disposed one above the other. Nevertheless, the improved machine renders it possible to select the steeping time with a high degree of accuracy and within the desired range.

Another advantage of the improved machine is that the steeping time is determined by the quantity of water which remains in the lower vessel when the evacuation of heated water by way of the riser is completed. This renders it possible to dispense with heretofore used mechanical, electrical or electronic steeping time selecting devices, and to reduce the overall cost of the machine accordingly. Moreover, the steeping time can be selected in a very simple and timesaving manner by the novel expedient of employing a longitudinally movable riser which is adjustable in a sense to change the level of its open lower end with reference to the lower vessel. As explained above, this entails corresponding changes in the quantity of water which remains in the lower vessel when the evacuation of hot water by way of the riser is terminated because the upper level of the remainder of the supply water no longer reaches the lower end of the riser.

The feature that the riser 30 can constitute a means for effecting evacuation of tea from the vessel 34 constitutes an optional characteristic of the improved tea making machine. Such feature is desirable and advantageous because it brings about automatic separation of freshly obtained hot beverage from tea leaves so that the lower vessel accumulates a supply of tea which is ready for pouring into cups or into other types of receptacles without the need to cause the beverage to flow through a filter.

The cylindrical riser 30 can be replaced with a riser having a polygonal cross-sectional outline. A cylindrical riser is preferred at this time because it can be inserted into the tubular portion 36 of the bottom wall 35 of the vessel 34 in any desired angular position. As stated above, the elastic ring 49 constitutes but one of the means which can be used to releasably (axially movably) hold the riser 30 in a selected position with reference to the bottom wall 35 of the vessel 34.

The diameter of the rim on the bottom panel 42 of the sieve 41 can be reduced to a fraction of that of the rim 44 which is shown in the drawing. However, a relatively large sieve or filter is preferred because it provides ample room for deposition of tea leaves on the bottom panel 42 so as to ensure intensive exchange of flavor between boiling water which has risen into the vessel 34 and penetrates through the perforations 43 on the one hand, and the supply of tea leaves on the panel 42 on the other hand. Moreover, it is simpler to introduce the tea leaves into the sieve 41 if the rim 44 is close to the inner side of the cylindrical wall of the vessel 34 because the leaves are less likely to descend into the annular space around the rim 44 so that they would be less likely to be contacted by hot water which rises through the perforations 43 of the bottom panel 42 when the machine is in use.

While it is possible to provide a discrete closure for the open top of the vessel 17, the illustrated design (wherein the bottom wall 35 of the vessel 34) forms part of the closure for the vessel 17 is preferred because it contributes to simplicity and lower cost of the machine. The same holds true for the cover 51, i.e., this cover need not necessarily be designed to serve as a closure for the vessel 17 when the vessel 34 is detached from the housing 11.

The heating means for the supply of water in the vessel 17 can comprise two or more discrete heaters for the upper section. All that counts is to ensure that the heat energy output of the heater or heaters for the relatively large quantity of water in the chamber 19 suffices to ensure that the temperature of such water rises to the boiling point within a desired (relatively short) interval of time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A tea making machine comprising a first vessel having an open top and arranged to receive a supply of water; means for heating said first vessel to the boiling point of the supply of water therein; a closure for the open top of said vessel; a second vessel disposed above said first vessel and arranged to receive and confine a supply of tea leaves; and a riser having open lower and upper ends respectively disposed within said first and second vessels, said riser providing a path for the flow of hot water between said vessels and being selectively movable up and down between a plurality of different positions in each of which a different quantity of water in the first vessel is located beneath said open lower end whereby the selected position of the riser determines the interval of time which is required by said heating means to evaporate the quantity of water beneath the lower end of the riser.

2. The machine of claim 1, wherein said riser constitutes an outlet for evacuation of the beverage which is formed in said second vessel as a result of steeping tea leaves in water that has risen from the first vessel along said path on heating of water to boiling point and ensuing rise of pressure in said first vessel.

3. The machine of claim 1, wherein said second vessel has a bottom wall which constitutes said closure.

4. The machine of claim 1, wherein said second vessel comprises a bottom wall having a tubular portion, said riser being longitudinally movably installed in said tubular portion.

5. The machine of claim 4, further comprising friction generating means interposed between said riser and said tubular portion.

6. The machine of claim 5, wherein said friction generating means includes an elastic ring surrounding said riser and disposed within said tubular portion.

7. The machine of claim 1, further comprising a sieve removably installed in said second vessel to support the supply of tea leaves therein, said sieve having an upwardly extending sleeve and the upper end of said riser being disposed in said sleeve.

8. The machine of claim 7, wherein said riser and said sleeve define a clearance for the flow of water between the open upper end of said riser and the interior of said second vessel.

9. The machine of claim 7, wherein said sleeve has a top wall overlying the open upper end of said riser.

10. The machine of claim 9, wherein said second vessel comprises a bottom wall having a tubular portion and said riser is longitudinally movably installed in said tubular portion, said tubular portion and said sleeve defining a space for the flow of water between the open upper end of said riser and the interior of said second vessel.

11. The machine of claim 9, wherein said top wall is spaced apart from the open upper end of said riser.

12. The machine of claim 1, wherein said riser has at least one opening disposed between said open ends in the interior of said first vessel.

13. The machine of claim 1, wherein said second vessel has a bottom wall and further comprising a sieve removably installed in said second vessel and having an apertured bottom panel adjacent said bottom wall and arranged to support the supply of tea leaves in the second vessel, said panel having an upwardly extending marginal rim and said sieve further comprising a sleeve extending upwardly from said panel, the upper end of said riser being located in said sleeve.

14. The machine of claim 13, wherein said panel is substantially horizontal and said sleeve is substantially vertical.

15. The machine of claim 1, wherein said second vessel includes a bottom wall which forms part of said closure, said closure further comprising a bayonet mount releasably connecting said bottom wall to said first vessel.

16. The machine of claim 1, wherein said first vessel comprises an upper section defining a first chamber for the supply of water, and a lower section defining a second chamber for the supply of water, said open lower end of said riser being located at a level at least close to said second chamber in at least one position of the riser so that the quantity of water in said second chamber determines or at least contributes to determination of said interval of time.

17. The machine of claim 16, further comprising a housing for said first vessel, said housing having a predetermined diameter and the upper section of said first vessel having a second diameter which is slightly smaller than said redetermined diameter.

18. The machine of claim 17, wherein said lower section of the first vessel is disposed substantially centrally of said upper section and has a diameter which is a relatively small fraction of said second diameter.

19. The machine of claim 16, wherein said heating means comprises discrete first and second heaters for water in the upper and lower sections of said first vessel.

20. The machine of claim 19, wherein the heat output of said first heater greatly exceeds the heat output of said second heater.

21. The machine of claim 19, further comprising a thermostat for said first heater, said thermostat being movably mounted on said housing.

22. The machine of claim 19, further comprising mobile thermostat means for at least one of said heaters.

23. The machine of claim 1, wherein said second vessel has an open top and further comprising a cover for the open top of said second vessel.

24. The machine of claim 23, wherein said closure is detachable from the open top of said first vessel and said cover has means for separably coupling it to the open top of said first vessel.

* * * * *